United States Patent
Nakamura et al.

(10) Patent No.: US 6,902,188 B2
(45) Date of Patent: Jun. 7, 2005

(54) CUSHION MOUNT WITH SLIDE DEVICE

(75) Inventors: Kenji Nakamura, Rochester Hills, MI (US); Michael J. Scavnicky, Northville, MI (US)

(73) Assignee: Takata Restraint Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/269,688

(22) Filed: Oct. 11, 2002

(65) Prior Publication Data

US 2004/0070183 A1 Apr. 15, 2004

(51) Int. Cl.$^7$ ............................................... B60R 21/22
(52) U.S. Cl. ........................ 280/730.2; 280/743.2; 280/753; 60/635; 74/2; 267/174
(58) Field of Search ............................ 280/730.2, 730.1, 280/743.2, 749, 753; 60/635, 632; 74/2; 185/37; 267/174

(56) References Cited

U.S. PATENT DOCUMENTS

| | | | |
|---|---|---|---|
| 962,946 A | 6/1910 | Cushman | |
| 3,687,485 A | 8/1972 | Campbell ............. | 280/150 AB |
| 4,860,698 A * | 8/1989 | Patrichi et al. ................ | 60/635 |
| 5,265,903 A | 11/1993 | Kuretake et al. ........... | 280/730 |
| 5,322,322 A | 6/1994 | Bark et al. | |
| 5,333,898 A | 8/1994 | Stutz ........................ | 280/730 |
| 5,377,554 A * | 1/1995 | Reulein et al. ................... | 74/2 |
| 5,462,308 A * | 10/1995 | Seki et al. ................ | 280/730.2 |
| 5,588,672 A | 12/1996 | Karlow et al. ........... | 280/730.2 |
| 5,605,346 A | 2/1997 | Cheung et al. .......... | 280/728.2 |
| 5,660,414 A | 8/1997 | Karlow et al. ............... | 280/749 |
| 5,707,075 A * | 1/1998 | Kraft et al. ............... | 280/730.2 |
| 5,899,491 A | 5/1999 | Tschaeschke ............ | 280/730.2 |
| 5,975,566 A | 11/1999 | Bocker et al. ........... | 280/730.2 |
| 6,099,029 A | 8/2000 | Haland et al. ............... | 280/729 |
| 6,135,497 A | 10/2000 | Sutherland et al. ......... | 280/749 |
| 6,155,596 A | 12/2000 | Nakajima et al. ........ | 280/730.2 |
| 6,168,193 B1 | 1/2001 | Shirk et al. ............... | 280/730.2 |
| 6,168,194 B1 | 1/2001 | Cuevas et al. ........... | 280/730.2 |
| 6,173,989 B1 | 1/2001 | Stutz ....................... | 280/730.2 |
| 6,176,515 B1 | 1/2001 | Wallner et al. .......... | 280/730.2 |
| 6,203,058 B1 | 3/2001 | Elqadah et al. .......... | 280/730.2 |
| 6,237,938 B1 | 5/2001 | Boxey ...................... | 280/730.2 |
| 6,237,939 B1 | 5/2001 | Resh ........................ | 280/730.2 |
| 6,237,943 B1 | 5/2001 | Brown et al. ............. | 280/730.2 |
| 6,302,434 B2 | 10/2001 | Nakajima et al. ........ | 280/730.2 |
| 6,431,588 B1 * | 8/2002 | Bayley et al. ............ | 280/730.2 |
| 2002/0070537 A1 * | 6/2002 | Webber et al. ........... | 280/730.2 |

FOREIGN PATENT DOCUMENTS

| | | |
|---|---|---|
| DE | 26 28 815 | 1/1978 |
| DE | 43 07 175 A1 | 9/1993 |
| WO | WO 93/09977 | 5/1993 |

* cited by examiner

Primary Examiner—Peter C. English
(74) Attorney, Agent, or Firm—Raggio & Dinnin, P.C.

(57) ABSTRACT

A restraint apparatus for protecting a vehicle occupant in a side impact or rollover event. The restraint apparatus includes a deployment guide that includes a housing having a channel with a substantially smoothed interior and longitudinal slot. A guide member is slidably retained in the channel and has an extension protruding from the slotted side of the channel. The extension is attachable to a restraint device deployable laterally of a vehicle occupant. An actuator is provided and is operable to drive the guide member from a first end of the channel toward a second end. A driving of the guide member facilitates deployment of the restraint device and supplies at least a longitudinal tensioning force to the restraint device to provide lateral support thereto.

6 Claims, 3 Drawing Sheets

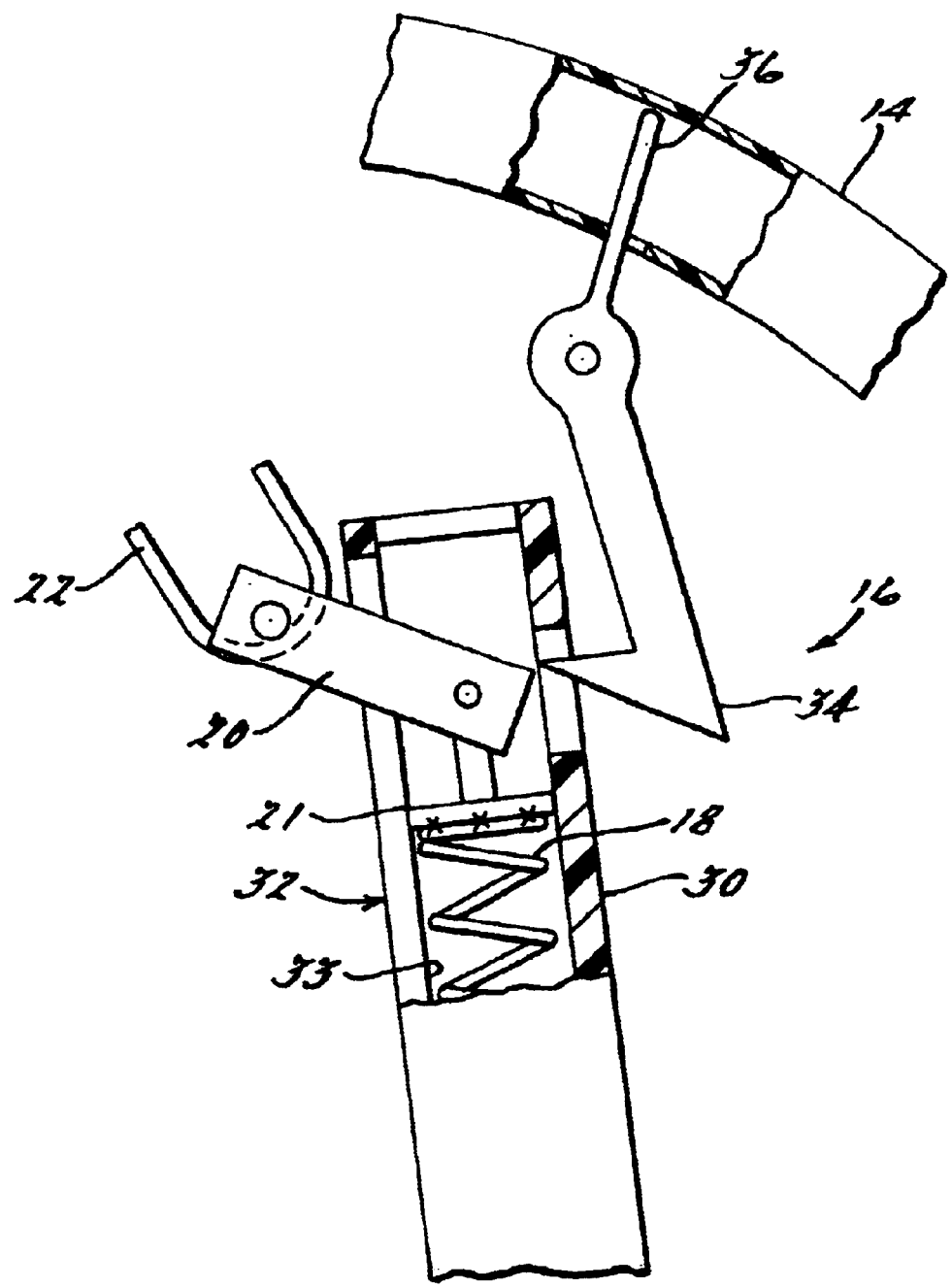

CUSHION MOUNT WITH SLIDE DEVICE

TECHNICAL FIELD

The present invention relates generally to side impact restraint devices, and more particularly to such a device having a cushion tethered to an actuatable slide device.

BACKGROUND OF THE INVENTION

Supplemental restraint devices have become commonplace in vehicles in recent years and engineering and design efforts have increasingly focused on such devices deployable along vehicles' interior sides. In the event of a side impact or vehicle rollover event, a curtain or inflatable cushion is rapidly positioned between the vehicle passenger and the window/door of the vehicle. Due to the limited vehicle structure that separates an occupant from a rapidly moving body impacting the side of the vehicle, occupants may sustain much greater injuries in side-impact events than front or rear impacts. The energy absorbed by the vehicle structure tends to be substantially less than the energy which may be absorbed in front-end or rear-end collisions. Moreover, the forces generated in side-impact or vehicle rollover events may actually cause the occupant to be ejected from the side of the vehicle. Some vehicles, due to their structure as well as a possible increased rollover risk, present particular problems in this area.

Various mounting methods and restraint apparatus configurations have been developed to assist in protecting occupants during such events. One approach has been to position a deflated or folded restraint cushion or curtain behind a trim panel located along the vehicle roof rail. When deployment is desired, the deploying restraint is actuated to burst through or push aside the trim panel, ultimately being positioned adjacent the occupant, where it absorbs impact from the occupant's head and torso. Where inflatable cushions are used, however, the necessarily rapid rate of inflation, coupled with the consequences of an occupant's head striking the deployed cushion, presents a challenge to maintaining a side cushion in its optimum deployed position. As always, there are continual efforts to improve the stability of the deployed airbag.

In addition to the concerns of maintaining the cushion in an optimum position throughout an accident sequence, the impact of an occupant's body on the cushion may actually displace the cushion from a position of maximum effectiveness. In response to this problem and those discussed above, a variety of tethering and mounting schemes have been designed to better support the cushion during deployment. U.S. Pat. No. 6,237,938 to Boxey is exemplary. Boxey provides a vehicle occupant protection device tethered to a slidable element retained in a guide track. In Boxey, inflation of the protection device drives it away from the roof rail, between the occupant and vehicle window. As the device inflates, the slidable element is drawn along its track by the tether, apparently reducing movement of the bottom edge of the cushion in a direction perpendicular to the inflation direction. Boxey presents one known approach, however, it is limited in a number of ways. Most importantly, lateral support from the slide apparatus is limited by the inflation/deployment of the cushion. Only when inflation of the cushion has drawn the slider to the bottom of its track, which angles away from the cushion's deployment direction, is the cushion maximally supported. Further, tensioning of the cushion is limited by the cushion's inflation pressurization.

SUMMARY OF THE INVENTION

In one aspect, a deployment guide for a vehicle occupant protection device is provided. The deployment guide has a housing with a channel having a substantially smooth interior and a slotted side. A guide member is also provided, is slidably retained in the channel, and includes an extension protruding from the slotted side of the channel. The extension is attachable to a restraint device deployable laterally of a vehicle occupant. An actuator is also provided, and is operable to drive the guide member from a first end of the channel toward a second end. A driving of the guide member facilitates deployment of the restraint device, and supplies at least a longitudinal tensioning force to the restraint device to provide lateral support thereto.

In another aspect, a side impact restraint apparatus for cushioning a vehicle occupant during a collision is provided. The apparatus includes an inflatable restraint cushion mounted inside the vehicle adjacent a side door, and deployable in a direction away from the roof rail of the vehicle. A guide member is movably mounted in a partially closed guide track fixed to an upright vehicle pillar. The guide member includes a portion extending through a slot in the guide track and connected to the inflatable restraint cushion. A gas generator is provided and is in fluid communication with an interior of the guide track. The gas generator is operable to supply pressurized gas to an interior of the guide track, and the pressurized gas drives the guide member through the guide track, thereby applying a tensioning force to the connected cushion and assists in positioning and maintaining the cushion in a deployed position.

In still another aspect, a side impact restraint apparatus for cushioning a vehicle occupant during a collision is provided. The apparatus includes an inflatable restraint cushion mounted inside the vehicle adjacent a side door, and a guide member movably mounted in a partially closed guide track fixed to a vehicle pillar. The guide member includes a body portion and a link portion, the link portion extending through a slot in the guide track and being connected to the inflatable restraint cushion. A spring actuator is fixed in a biased state and connected to the guide member, the spring actuator being releasable to drive the guide member through the guide track, thereby tensioning the cushion connected therewith, and assisting in positioning and maintaining the cushion in a deployed position.

BRIEF DESCRIPTION OF THE DRAWINGS

FIG. 6 is a cross-sectional view of the deployment of FIG 1.

DETAILED DESCRIPTION

Figure 1:
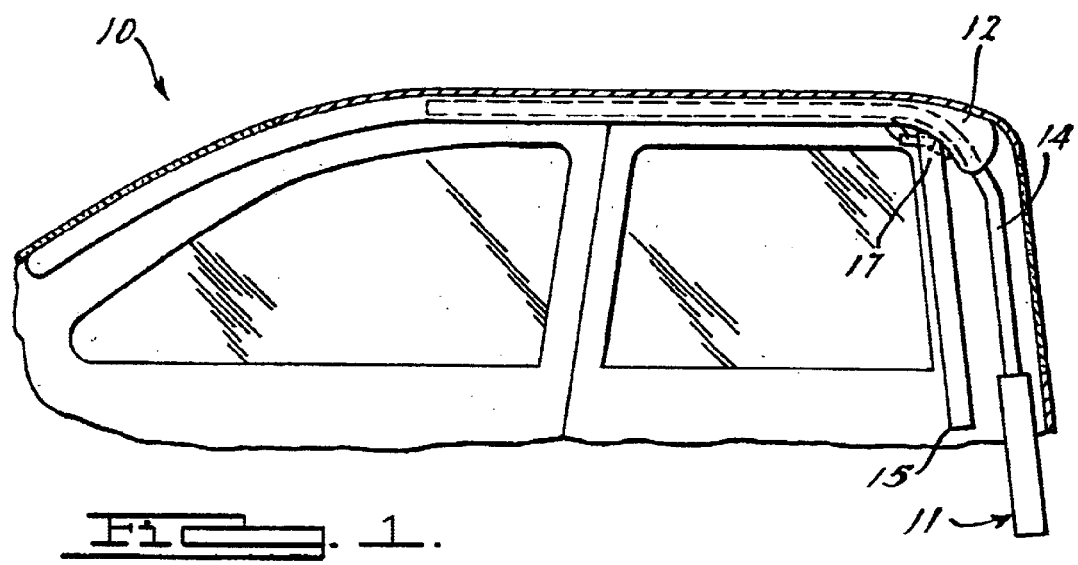
FIG. 1 is a side view of a restraint apparatus with a deployment guide according to the present invention.

Referring to FIG. 1, there is shown a side view of an occupant protection apparatus 10 according to a preferred embodiment of the present invention. Apparatus 10 is directed to assisting in the deployment and lateral support of a side impact restraint device. Apparatus 10 actively assists the restraint device in rapidly and accurately deploying in a direction away from a vehicle roof rail. Once deployed, the apparatus provides lateral support to the restraint, lessening the likelihood that it will be displaced or forced out through the vehicle window during a crash or rollover event, and likewise reducing the risk of occupant ejection and/or injury. Apparatus 10 includes a restraint device 12, which is preferably a conventional inflatable airbag or cushion, shown in its folded/stored condition, as it would appear in a de-activated state prior to a crash. It should be appreciated that embodiments are contemplated in which a non-inflatable curtain is utilized rather than an airbag. In a preferred embodiment, apparatus 10 is stored in the vehicle within the trim panels, and the cushion "bursts" through, tears, or otherwise displaces the trim when it is deployed, in a manner well known in the art. An inflator 11 is also preferably provided, and may be any suitable pyrotechnic inflator or compressed gas inflator, though a pyrotechnic type is preferred. An inflator tube 14 preferably connects inflator 11 to an inlet of cushion 12 and supplies gas for its inflation in a conventional manner. In a preferred embodiment, a crash sensor (not shown) is also provided, and sends an activation signal to inflator 11 in the event of a crash or other appropriate circumstances. All the component parts of apparatus 10, and the alternative embodiments described herein, are constructed from known materials and by known processes.

Figure 2:
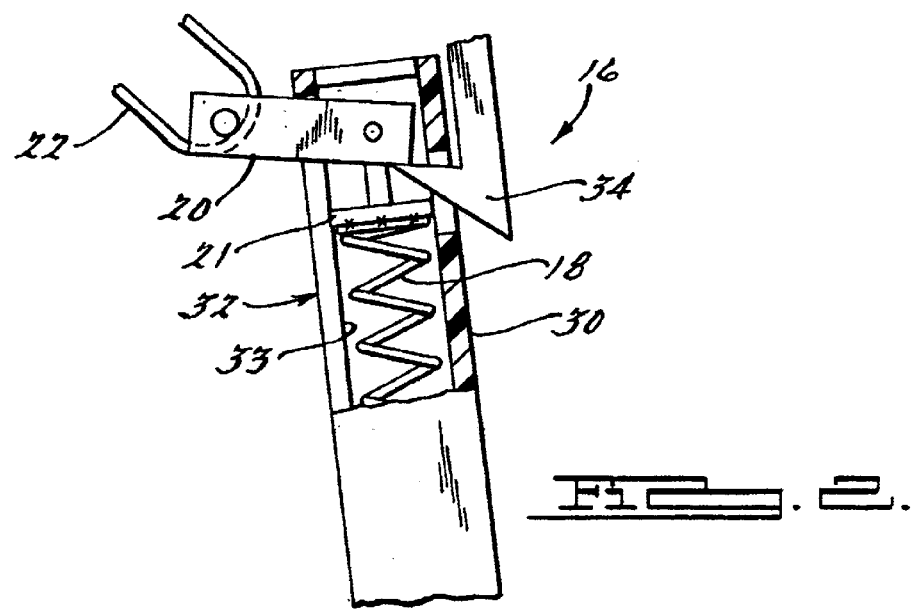
FIG. 2 is a partial close up view of the deployment guide of FIG. 1.
Figure 5:
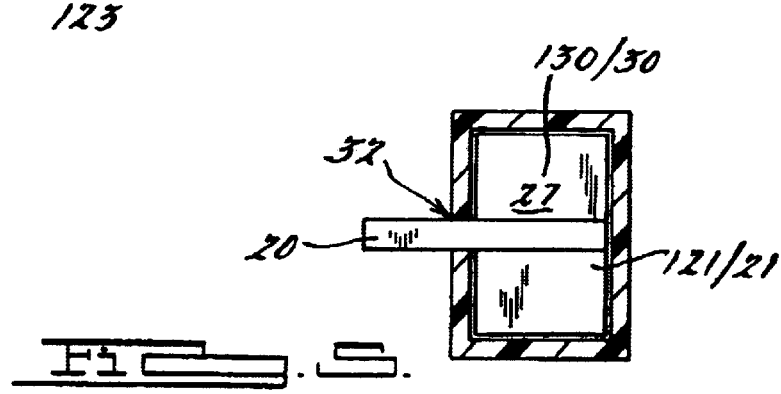
FIG. 5 is a partial longitudinal cross-section of channel and guide member components common to described embodiments of the present invention.

Referring in addition to FIG. 2, apparatus 10 also includes an active assist device 16, which has a biasing member 18 affixed to a guide member or slider 21, and a connector bar 20, connected via a tether 22 to cushion 12. Biasing member 18 is preferably a conventional helical spring. Tether 22 may be any suitable preferably flexible cord, such as a conventional loop of rope. It should be appreciated, however, that tether 22 is not indispensable and connector bar 20 could be attached directly to the cushion or curtain without departing from the scope of the present invention. Furthermore, a tether might be used in place of connector bar 20, connecting the cushion 12 directly to slider 21. Slider 21 and biasing member 18 are slidably positioned in a partially closed guide channel 30. Guide channel 30 and slider 21 are preferably substantially rectangular in cross section, as shown in FIG. 5; however, alternative configurations are possible without departing from the scope of the present invention. Channel 30 has at least a first linear wall 33 that preferably traverses a relatively straight line along the length of the channel. Those skilled in the art will appreciate that first linear wall 33 might be located on any side of channel 30. Slider 21 is preferably metallic, and may have dimensions different from those illustrated in the drawing figures. Further, slider 21 may be fitted with rollers, reduced-friction surfaces, or some other means for facilitating travel through channel 30. Biasing member 18 is preferably attached at a bottom end 15 of channel 30, and stretched or expanded in an upward direction to an energized state, in turn biasing slider 21 downward toward bottom end 15. In a preferred embodiment, biasing member 18 is expanded to span the entire distance between bottom end 15 and the energized position of slider 21, proximate top end 17. Biasing member 18 might be shortened, however, and a cable used to connect with slider 21 or bottom end 15. It is merely necessary that biasing member 18 be capable of relatively rapidly drawing slider 21 toward the bottom of channel 30. Slider 21, or alternatively bar 20, engages a retainer 34, which is preferably a hinged trigger but might also be a reciprocable pin or some other suitable trigger device, and is thereby securable in a downwardly biased state preferably proximate upper end 17 of channel 30. Guide channel 30 has a longitudinal slot 32 that is substantially coextensive with its length, through which connector bar 20 extends, allowing slider 21 to travel downward uninhibited.

In the event of a crash or vehicle rollover, an onboard crash sensor preferably generates a signal that initiates actuation of retainer 34, causing it to disengage slider 21/bar 20, and allowing slider 21 to begin to travel down channel 30 under the influence of biasing member 18. A variety of disengagement means are contemplated. For instance, an electromagnetic actuator might be employed to pull retainer 34 out of position. Alternatively, retainer 34 might be designed with a pressure surface 36 extending upward into the path of inflation gas from inflator 11, e.g. penetrating the wall of tube 14. In this embodiment, independent actuating means for retainer 34 might be unnecessary, and the force of the inflation gas for the vehicle airbag could be used to disengage retainer 34. Similarly, the timing of actuation would be linked to the timing of inflator activation, simplifying the system. In any event, retainer 34 should be disengaged from apparatus 16 approximately contemporaneous with initiation of inflation of cushion 12. Because biasing member 18 is fixed at the bottom end 15 of channel 30, and extended from its unbiased condition toward the top end 17 of channel 30, immediately upon release of retainer 34, slider 21 is pulled relatively rapidly down channel 30. Because bar 20 connects slider 21 to cushion 12 via tether 22, the downward movement of slider 21 begins to pull cushion 12 downward, away from the vehicle roof rail. The preferably flexible nature of tether 22 allows a degree of "play," such that the fabric of cushion 12 is not torn by the force from device 16. Slot 32 accommodates bar 20 as the apparatus travels downward. Meanwhile, cushion 12 is inflating with high pressure gas from inflator 11. The effect of the gas inflating cushion 12, coupled with the downward pull on cushion 12 from apparatus 16, results in a generally longitudinal and/or diagonal tensioning of cushion 12 along the length of the vehicle compartment. Consequently, speed and predictability of deployment of cushion 12 away from the vehicle roof rail is enhanced. Moreover, once the cushion is fully deployed, the tension at its lower corner assists the cushion in remaining between the occupant and the door/window, even upon multiple impacts from an occupant. The added support to the cushion further reduces the risk of an occupant being ejected through the vehicle side window during crash and rollover events.

Figure 3:
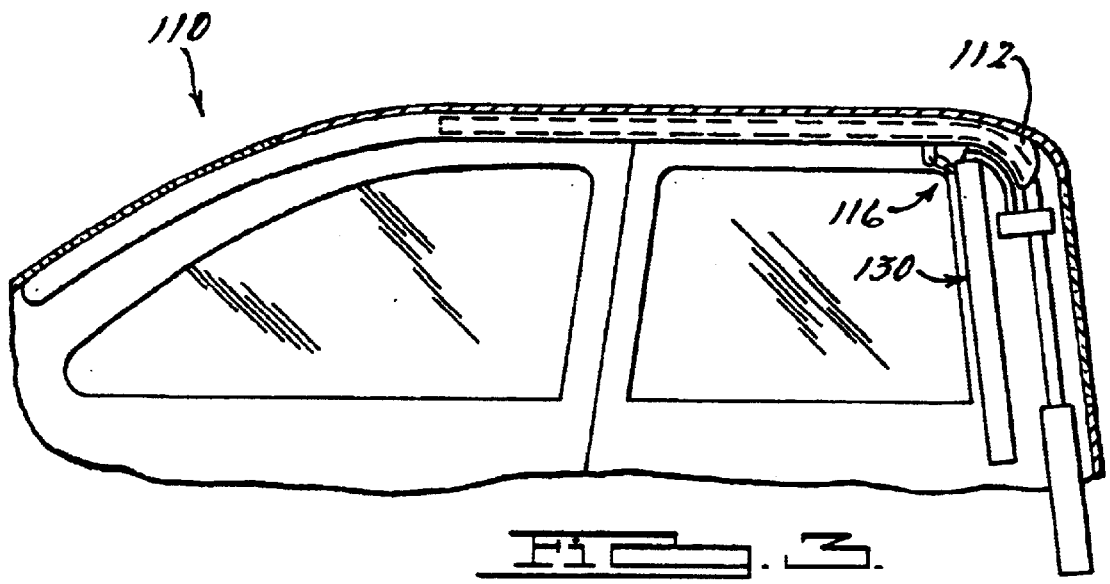
FIG. 3 is a side view of a second embodiment of a restraint apparatus with a deployment guide according to the present invention.
Figure 4:
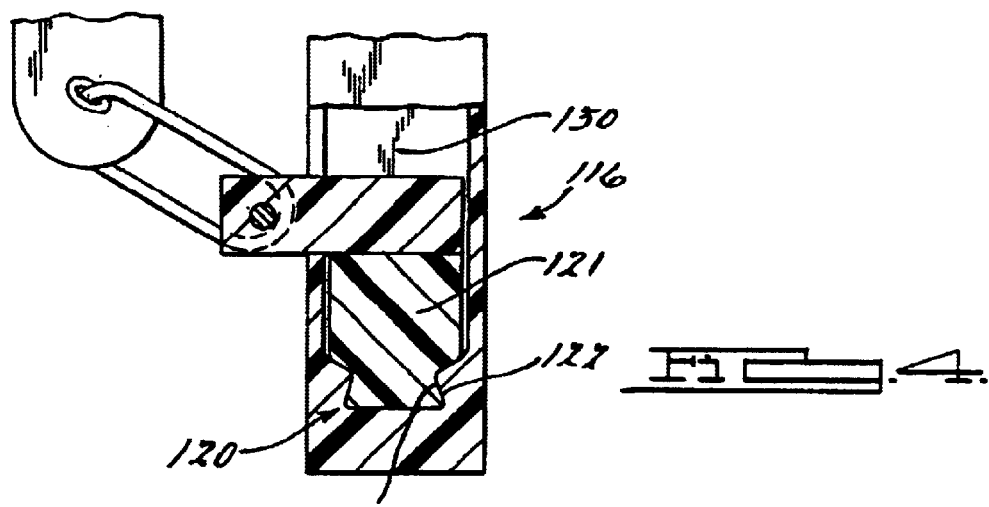
FIG. 4 is a partial view of the apparatus of FIG. 3, illustrating the deployment guide after deployment of the restraint apparatus.

Referring to FIG. 3, there is shown an alternative embodiment 110 of the present invention. Apparatus 110 is similar to apparatus 10, yet has a number of significant differences. Rather than a biased spring actuator to drive the slider, apparatus 110 utilizes a pressurized gas actuator 116. When activation of the assist mechanism is desired, a high pressure gas is supplied to drive a slider 121 down a channel 130, tensioning the associated cushion 112 in a manner similar to that described with regard to the first embodiment. An embodiment is contemplated in which a single inflator is used to both inflate cushion 112 and to drive slider 121, as well as another embodiment in which separate inflators are used. Further still, rather than conventional pyrotechnic inflators, pressurized gas canisters might be used to supply the actuation gas. Referring now in particular to FIG. 4, there is shown a close-up view of apparatus 116 after deployment of cushion 112. FIG. 4 illustrates a catch mechanism 120, which prevents slider 121 from retracting from the bottom end of channel 130 after deployment. In a preferred embodiment, slider 121 is formed with an outwardly flared boss 122 that snap-fits into a substantially complementary receptacle 123 when slider 121 is driven to the bottom end of channel 130, thereby preventing slider 121 from "bouncing back," or being pulled from the bottom end by the impact of an occupant against cushion 112. Those skilled in the art will appreciate that the dimensions and configuration of catch mechanism 120 might be varied from the embodiment depicted in FIG. 4. FIG. 5 is a longitudinal cross-section of channel 30, 130, illustrating the preferred close-clearance fit between the slider 21, 121, and the interior of the channel 30, 130. In the second embodiment, the top surface 27 of the slider serves as a pressure surface responsive to pressurized gas. Bar 20 preferably extends from channel 30 via slot 32 to engage tether 22.

It should be appreciated that the present description is for illustrative purposes only, and should not be construed to limit the breadth of the present invention in any way. Thus, those skilled in the art will appreciate that various modifications might be made to the presently disclosed embodiments without departing from the spirit and scope of the present invention. Other aspects, features, and advantages will be apparent upon an examination of the drawing figures and appended claims.

What is claimed:

1. A deployment guide for a vehicle occupant restraint device, comprising:
   a housing having a channel with a slotted side, said channel having a first end and a second end;
   a guide member slidably retained in said channel and attachable to a deployable restraint device;
   an actuator operable to drive said guide member alone said channel to provide a tensioning force to said restraint device, said actuator comprising a spring having a first end engaging said guide member and a second end secured toward said second end of said channel; and
   a hinged trigger proximate said first end of said channel, said guide member engageable with said trigger; said trigger operable to disengage said guide member upon deployment of said restraint device.

2. A guide according to claim 1 further comprising a flexible tether integral with said restraint device, said flexible tether connecting said restraint device to said guide member.

3. A side impact restraint apparatus mounted in a vehicle for protecting an occupant during a collision, said apparatus comprising:
   an inflatable restraint cushion mounted inside the vehicle;
   a partially closed guide track;
   a guide member movably mounted in said guide track, said guide member connected with said inflatable restraint cushion; and
   a spring actuator coupled to said guide member and expansible to an energized state, said spring actuator releasable from said energized state to drive said guide member through said guide track, thereby tensioning said cushion, wherein said spring actuator is releasable from said energized state by actuating a trigger with pressurized gas from an airbag inflator.

4. The restraint apparatus of claim 3 wherein said spring actuator is a helical spring positioned in said guide track.

5. A restraint apparatus for a vehicle comprising:
   an inflatable restraint device;
   a housing having a partially enclosed channel with a longitudinal slot;
   a slidable member retained in said channel and attachable to said restraint device;
   an actuator operable to drive said slidable member toward an end of said channel through a defined length of travel; and
   a catch for retaining said slidable member at a terminus end of said length of travel, said catch comprising a boss on said slidable member and a substantially complementary receptacle defined by said housing, said boss engageable with said receptacle to prevent dislodging of said slidable member when engaged therewith, and said catch is disengaged until said slidable member reaches said terminus end of said length of travel.

6. The restraint apparatus of claim 5, wherein said boss is a flared extension from an underside of said slidable member, said boss snap-fittable with said receptacle.

* * * * *

UNITED STATES PATENT AND TRADEMARK OFFICE
CERTIFICATE OF CORRECTION

PATENT NO. : 6,902,188 B2
DATED : June 7, 2005
INVENTOR(S) : Kenji Kakamura et al.

It is certified that error appears in the above-identified patent and that said Letters Patent is hereby corrected as shown below:

<u>Column 5,</u>
Line 31, please delete "alone" and insert -- along --.

Signed and Sealed this

Eighteenth Day of October, 2005

JON W. DUDAS
*Director of the United States Patent and Trademark Office*